(12) United States Patent
Hong et al.

(10) Patent No.: US 10,557,606 B2
(45) Date of Patent: Feb. 11, 2020

(54) LIGHT SOURCE DEVICE USING POLARITY OF MATERIAL AND VEHICLE LAMP HAVING THE SAME

(71) Applicants: Hyundai Motor Company, Seoul (KR); Kia Motors Corporation, Seoul (KR)

(72) Inventors: Seung-Pyo Hong, Gyeonggi-do (KR); Ji-Hoon Baek, Seoul (KR); Joon-Bo Shim, Gyeonggi-do (KR); Seong-Yeop Kang, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/150,749

(22) Filed: Oct. 3, 2018

(65) Prior Publication Data

US 2019/0154218 A1  May 23, 2019

(30) Foreign Application Priority Data

Nov. 23, 2017  (KR) .......................... 10-2017-0157368

(51) Int. Cl.

| | |
|---|---|
| *F21S 41/125* | (2018.01) |
| *F21S 41/65* | (2018.01) |
| *F21S 41/19* | (2018.01) |
| *F21S 41/153* | (2018.01) |
| *F21S 43/14* | (2018.01) |
| *B60Q 1/26* | (2006.01) |
| *F21S 43/20* | (2018.01) |
| *F21W 103/10* | (2018.01) |

(Continued)

(52) U.S. Cl.
CPC .......... *F21S 41/125* (2018.01); *B60Q 1/2607* (2013.01); *F21S 41/153* (2018.01); *F21S 41/19* (2018.01); *F21S 41/65* (2018.01); *F21S 43/14* (2018.01); *F21S 43/255* (2018.01); *F21S 43/26* (2018.01); *F21S 41/64* (2018.01); *F21W 2103/10* (2018.01); *F21W 2103/20* (2018.01); *F21W 2103/55* (2018.01)

(58) Field of Classification Search
CPC ........ F21S 41/125; F21S 43/14; F21S 41/153; F21S 41/19; F21S 43/255; F21S 41/65; F21S 43/26; F21S 41/64; B60Q 1/2607; F21W 2103/10; F21W 2103/20; F21W 2103/55; F21V 9/00; F21V 9/08; F21V 9/12; F21V 9/14; F21V 9/40; F21V 99/00
See application file for complete search history.

(56) References Cited

U.S. PATENT DOCUMENTS

2016/0274351 A1*  9/2016  Riegel ...................... F21V 5/00

FOREIGN PATENT DOCUMENTS

KR  20160018024 A  2/2016

* cited by examiner

*Primary Examiner* — Bao Q Truong
(74) *Attorney, Agent, or Firm* — Mintz Levin Cohn Ferris Glovsky and Popeo, P.C.; Peter F. Corless

(57) ABSTRACT

A light source device using a polarity of a material may include a transparent frame forming an inner space accommodating a nonpolarity material and a polarity material; a light source portion irradiating light through the nonpolarity material or the polar material accommodated in the transparent frame; and an electromagnet configured to switch respective positions of the nonpolarity material and the polar material by a magnetic force generated as a current is applied from outside of the light source device.

17 Claims, 17 Drawing Sheets

(a)

(b)

(51) Int. Cl.
*F21W 103/20* (2018.01)
*F21W 103/55* (2018.01)
*F21S 41/64* (2018.01)

LIGHT SOURCE DEVICE USING POLARITY OF MATERIAL AND VEHICLE LAMP HAVING THE SAME

CROSS-REFERENCE TO RELATED APPLICATION

This application claims the benefit of priority to Korean Patent Application No. 10-2017-0157368, filed on Nov. 23, 2017 in the Korean Intellectual Property Office, the disclosure of which is incorporated herein by reference in its entirety.

BACKGROUND OF THE DISCLOSURE

Field of the Disclosure

Embodiments of the present disclosure relate to a light source device using a polarity of a material and a vehicle lamp having the same. More particularly, the embodiments of the present disclosure relate to a light source device using a polarity of a material which is applied to a vehicle lamp and a vehicle lamp having the same.

Description of Related Art

Vehicle lamps can be installed at different positions at an exterior of a vehicle and employ light sources having different functions according to the intended purpose of use. Vehicle lamps are required for complying with safety regulations, while serving an important role in vehicle design.

Vehicle lamps may be roughly divided into front-side lamps and rear-side lamps. Typical examples of front-side lamps include headlamps, fog lamps, daytime running lamps (DRLs), side repeaters, and the like, and typical examples of rear-side lamps include rear combination lamps, high mounted stop lamps, license plate lamps, and the like.

Conventional vehicle lamps provide lighting using general bulbs. In recent years though, semi-permanent light-emitting diodes (LEDs) or optical modules having superior lighting performance have been used instead of bulbs. Such vehicle lamps can be configured using structural, optical, and electronic techniques, and recently, as use of LED light sources have become widespread, optical electronic components are greatly emerging.

In recent years, a plurality of LED light sources have been utilized in vehicle lamps to implement a matrix beam. However, installing the plurality of LED light sources so as to implement such a matrix beam can be costly. Further, there is need for reducing the number of LED light sources since each LED light source should be controlled so as to implement the matrix beam. Such control should be performed electronically since mechanical control of LED light sources can generate noise and malfunction.

The matrix beam is often implemented using the plurality of LED light sources for efficient heat dissipation. Discharging heat energy is necessary during operation. However, conventional heat dissipation structures, such as a heat sink or the like, can be relatively large. Furthermore, there is a need for cost reduction and performance improvement of such structures since many vehicle lamps implement a matrix beam using a plurality of LED light sources.

SUMMARY OF THE DISCLOSURE

Embodiments of the present disclosure are directed to a light source device using a polarity of a material which is applied to a vehicle lamp by varying a color of light emitted from a light source using a characteristic capable of switching a position of the material by a magnetic force according to the polarity of the material, and a vehicle lamp having the same.

Other objects and advantages of the present disclosure can be understood by the following description and become apparent with reference to the embodiments of the present disclosure. Also, objects and advantages of the present disclosure can be realized by the means as claimed and combinations thereof.

In accordance with embodiments of the present disclosure, a light source device using a polarity of a material can include: a transparent frame forming an inner space accommodating a nonpolarity material and a polarity material; a light source portion irradiating light through the nonpolarity material or the polar material accommodated in the transparent frame; and an electromagnet configured to switch respective positions of the nonpolarity material and the polar material by a magnetic force generated according to the polarity of the material, wherein the magnetic force is generated as a current is applied from outside of the light source device.

The nonpolarity material and the polarity material may have different specific gravities or different colors.

The electromagnet may be disposed at a position beside, above, or below the transparent frame.

The electromagnet may be one of a plurality of electromagnets. When the plurality of electromagnets are disposed at a plurality of positions relative to the transparent frame and a current is alternately applied to the plurality of electromagnets, the nonpolarity material and the polarity material may have different colors irrespective of their specific gravities.

The light source portion may be disposed inside the transparent frame and subject to a watertight treatment.

When the transparent frame has a U-shape, the light source portion may be disposed at a recessed hollow portion of the transparent frame outside the transparent frame.

A plurality of transparent frames, including the transparent frame, may be disposed in a matrix structure which is arranged in rows and columns, the light source portion may be disposed outside the transparent frame, and each of a plurality of electromagnets, including the electromagnet, may be disposed separately at each of the plurality of transparent frames.

The light source portion may include a plurality of light sources, each of which disposed at a position corresponding to each of the plurality of transparent frames.

The light source portion may include a light guide or a reflector diffusing light to each of the plurality of transparent frames, and the light source portion may include a single light source.

Each light source may include a light-emitting device (LED) element or a bulb.

Furthermore, in accordance with embodiments of the present disclosure, a vehicle lamp can include: a light source device including an electromagnet configured to switch respective positions of a nonpolarity material and a polarity material by a magnetic force generated according to a polarity of a material, the switching of respective positions of the nonpolarity material and the polarity material causing variance of a color of light emitted from a light source of the light source device; and a lamp housing coupled to the light source device and mounted on a vehicle.

The light source device may include a transparent frame forming an inner space accommodating the nonpolarity material and the polarity material; a light source portion irradiating light through the nonpolarity material or the polarity material accommodated in the transparent frame; and the electromagnet configured to switch the respective positions of the nonpolarity material and the polarity material by the magnetic force generated as a current is applied from outside of the light source device.

A plurality of transparent frames, including the transparent frame, may be disposed in a matrix structure which is arranged in rows and columns, the light source portion may be disposed outside the transparent frame, and each of a plurality of electromagnets, including the electromagnet, may be disposed separately at each of the plurality of transparent frames.

The light source device may operate as a daytime running lamp (DRL), a position lamp, and a front turn lamp when the lamp housing is mounted on a front side of the vehicle, and the light source device may operate as a rear combination lamp when the lamp housing is mounted on a rear side of the vehicle.

BRIEF DESCRIPTION OF THE DRAWINGS

The embodiments herein may be better understood by referring to the following description in conjunction with the accompanying drawings, briefly described below, in which like reference numerals indicate identically or functionally similar elements.

Figure 1A:
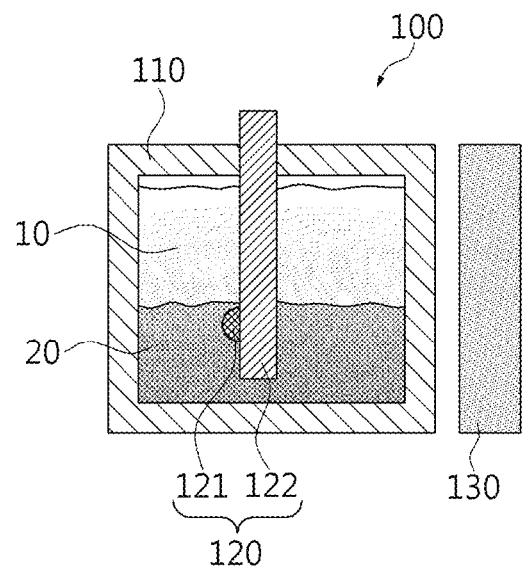
FIGS. 1A and 1B are diagrams of a light source device using a polarity of a material according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. However, in the following description and the accompanying drawings, if it is determined that well-known functions or configurations may obscure the gist of the present disclosure, detailed descriptions thereof will be omitted. Further, it is noted that the same components are denoted by the same reference numerals throughout the drawings.

Further, terms or words used herein and the appended claims should not be construed to be limited to ordinary or dictionary meanings, and, these should be construed in accordance with the meaning and concept consistent with the technical spirit of the present disclosure according to the principle in that inventors can properly define concepts of terms in order to describe their disclosures with the best manner.

Therefore, the embodiments described in the present disclosure and the configurations illustrated in the drawings are merely certain embodiments of the present disclosure, and do not represent all the technical spirits of the present disclosure, so that it should be understood that various equivalents and modifications, which are capable of replacing the embodiments and the configurations, are possible at the time of filing the present application.

Some components are exaggerated, omitted, or schematically illustrated in the accompanying drawings, and a size of each component does not substantially reflect an actual size thereof. The present disclosure is not limited by a relative size or a spacing illustrated in the accompanying drawings.

When a component is referred to as "being included" in a portion, this means that other component may be further included rather than not be included in the portion unless the context clearly describes otherwise. Further, when a portion is referred to as being "connected to" other portion, this includes not only "being directly connected to" but also "being electrically connected to" by interposing another element between the portion and the other portion.

Unless the context clearly dictates otherwise, the singular form includes the plural form. It should be understood that terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Embodiments of the present disclosure will be fully described in a detail below which is suitable for implementation by those skilled in the art with reference to the accompanying drawings. However, the present disclosure may be implemented in various different forms, and thus it is not limited to embodiments to be described herein. In the drawings, some portions not related to the description will be omitted in order to clearly describe the present disclosure, and similar reference numerals are given to similar components throughout the disclosure.

Hereinafter, embodiments of the present disclosure will be described in detail with reference to the accompanying drawings.

Figure 1B:
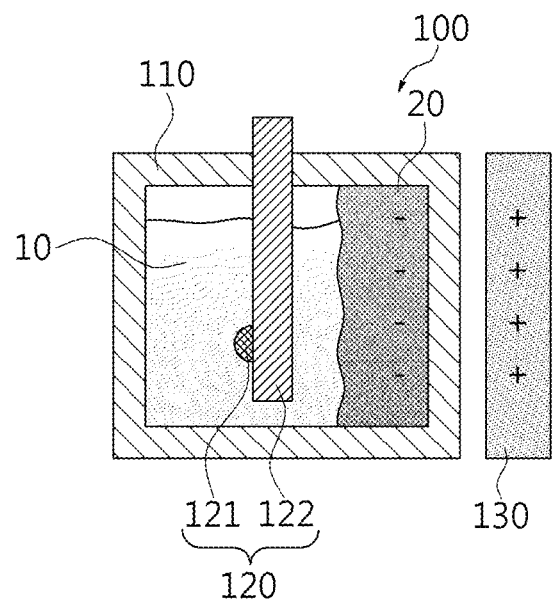

FIGS. 1A and 1B are diagrams of a light source device using a polarity of a material according to embodiments of the present disclosure.

As shown in FIGS. 1A and 1B, a light source device 100 using a polarity of a material (hereinafter, referred to as "light source device 100") according to embodiments of the present disclosure may be applied to a vehicle lamp having various functions by varying a color of light emitted from a light source using a characteristic capable of switching a position of the material by a magnetic force according to the polarity of the material. That is, the light source device 100 uses at least one electromagnet to switch positions of a nonpolarity material and a polarity material by a magnetic force generated according to a polarity to vary the color of light emitted from the light source.

The vehicle lamp may include a lamp housing (not shown) at which the light source device 100 is installed. The light source device 100 is assembled at (i.e., coupled to) the lamp housing and mounted on a vehicle as a vehicle lamp.

The light source device 100 includes a transparent frame 110, a light source portion 120, and an electromagnet 130.

First, the transparent frame 110 forms one inner space configured to accommodate a nonpolarity material 10 and a polarity material 20. At this point, an opening is formed at the transparent frame 110 to allow the polarity material 20, the nonpolarity material 10, and the light source portion 120 to be inserted into the inner space.

The opening of the transparent frame 110 may be formed at an upper surface or a side surface (i.e., a front surface or a rear surface) of the transparent frame 110 in consideration of an irradiation direction of light emitted from the light source portion 120. That is, the opening of the transparent frame 110 is formed at the upper surface thereof when the light emitted from the light source portion 120 will be irradiated in a direction of the front surface of the transparent frame 110, and the opening of the transparent frame 110 is formed at the side surface thereof when the light emitted from the light source portion 120 will be irradiated in a direction of the upper surface or a lower surface of the transparent frame 110.

Here, the opening of the transparent frame 110 is preferably sealed after the nonpolarity material 10, the polarity material 20, and the light source portion 120 have been inserted into the opening. This is because of preventing the nonpolarity material 10 or the polarity material 20 from leaking to the outside due to applying of impact to the light source device 100 or switching positions of the nonpolarity material 10 and the polarity material 20.

Further, the transparent frame 110 is made of a transparent material having light transmittance similar to that of each of the nonpolarity material 10 and the polarity material 20. This is because of preventing an increase of an optical loss of the light emitted from the light source portion 120 due to refraction resulting from a variation in light transmittance.

Further, the inner space of the transparent frame 110 may be formed as a polyhedral structure. At this point, each frame surface forming the inner space may be designed to have a structure for forming a desired light distribution pattern with respect to the light emitted from the light source portion 120. For example, the transparent frame 110 may have a diffusion structure in which a width of a side surface along a direction of the light emitted from the light source portion 120 is gradually widened, and a front surface perpendicular to the direction of the light is formed in a convex shape at the outside of the transparent frame 110.

Meanwhile, the nonpolarity material 10 filled in the inner space of the transparent frame 110 is a material which is easily layered and separated from the polarity material 20, has no polarity, and is close to hydrophobic substances (e.g., oil, benzene, and the like). Here, when the nonpolarity material 10 is in a gas phase, the nonpolarity material 10 may be easily layered and separated from the polarity material 20 using a difference in density between the nonpolarity material 10 and the polarity material 20, and the nonpolarity material 10 may have a color and be dissolved in fluid to exhibit a color. The nonpolarity material 10 is not aligned in a magnetic field formed by the electromagnet 130.

On the other hand, the polarity material 20 filled in the inner space of the transparent frame 110 is a material which has a polarity that is easily aligned in one direction in the magnetic field formed by the electromagnet 130. The polarity material 20 is a material with which an electrolyte is mixed on the basis of a material containing a hydrogen bond, and the polarity material 20 is not mixed with the nonpolarity material 10 and is easily layered and separated from the nonpolarity material 10 due to a difference in specific gravity between the polarity material 20 and the nonpolarity material 10. Here, the electrolyte is a material which is dissolved in the polarity material 20 and dissociates into ions to allow a current to flow, and the electrolyte may exhibit a specific color.

Thus, the nonpolarity material 10 and the polarity material 20 serve to absorb heat from the light source portion 120 to discharge the heat to the outside using a material having a phase change temperature of 125 Celsius degrees or higher.

The light source portion 120 emits the light through the nonpolarity material 10 or the polarity material 20 accommodated in the transparent frame 110. Accordingly, a color of the light emitted from the light source portion 120 is determined according to a color included in the nonpolarity material 10 or the polarity material 20.

Further, the light source portion 120 is configured such that one or more light sources 121 are mounted on a printed circuit board (PCB) substrate 122 to be electrically connected to each other by soldering and are subject to a watertight treatment because of being used in a state in which the one or more light sources 121 are immersed in the nonpolarity material 10 and the polarity material 20 accommodated in the inner space of the transparent frame 110. Here, the light source 121 may be in the form of a light-emitting diode (LED) element or a bulb, and a circuit pattern may be formed on the PCB substrate 122 to supply a control signal and power to the one or more light sources 121.

However, the light source portion 120 may be provided outside the transparent frame 110. This will be described below with reference to FIG. 4.

The light source portion 120 irradiates the light in a vertical direction of the PCB substrate 122 when terminals of the one or more light sources 121 are directly inserted into and mounted on the PCB substrate 122. At this point, the one or more light sources 121 may be surface-mounted on the PCB substrate 122. Accordingly, when the light source portion 120 is inserted into the inner space of the transparent frame 110 through the opening formed at the upper surface of the transparent frame 110, the light source portion 120 irradiates light on the front surface of the transparent frame 110, and, when the light source portion 120 is inserted into the inner space of the transparent frame 110 through the opening formed at the side surface of the transparent frame 110, the light source portion 120 irradiates light on the upper surface or the lower surface of the transparent frame 110.

Alternatively, when the light source portion 120 is inserted into the inner space of the transparent frame 110 through the opening formed at the side surface of the transparent frame 110, the light source portion 120 may irradiate light on the front surface of the transparent frame 110. The alternative case is possible when the terminals of the one or more light sources 121 are bent by 90 degrees and are inserted into and mounted on the PCB substrate 122. Further, the alternative case is possible when the one or more light sources 121 are mounted on a separate auxiliary substrate and then the separate auxiliary substrate is uprightly raised and electrically connected to the PCB substrate 122.

The electromagnet 130 is a magnet which is magnetized when a current flows and returns to its original state without being magnetized when the current is blocked, and the electromagnet 130 forms a magnetic force in the polarity material 20 and the nonpolarity material 10 which are filled in the inner space of the transparent frame 110.

Referring to FIG. 1B, when a magnetic force is generated by the electromagnet 130, the polarity material 20 moves in a direction of the electromagnet 130, and, since the nonpolarity material 10 is not affected by the magnetic force generated by the electromagnet 130, the nonpolarity material 10 fills an empty space that is formed due to the movement of the polarity material 20.

As described above, the electromagnet 130 operates to switch the nonpolarity material 10 or the polarity material 20 which is in contact with the one or more light sources 121. That is, the electromagnet 130 switches respective positions of the nonpolarity material 10 and the polarity material 20 using the magnetic force formed as the current is applied from a source outside of the light source portion 120. Accordingly, a color of the light emitted from the light source portion 120 may be varied according to the color included in the nonpolarity material 10 or the polarity material 20.

As described above, the light source device 100 shown in FIGS. 1A and 1B may implement a daytime running lamp (DRL), a position lamp, and/or a front turn lamp.

That is, as shown in FIG. 1A, when the current is not applied to the electromagnet 130, the light source device 100 may implement white light and may be used as the DRL and the position lamp. Further, as shown in FIG. 1B, when the current is applied to the electromagnet 130, the light source device 100 may implement yellow light to use the yellow light for the front turn lamp.

As described above, there may obtain an effect of satisfying regulations for which light of the DRL should not be exhibited when light emitting surfaces of the DRL and the front turn lamp are shared.

FIGS. 2A to 2D are diagrams illustrating a case in which a light source device is configured according to specific gravity and a color of each of a polarity material and a nonpolarity material.

Figure 2A:
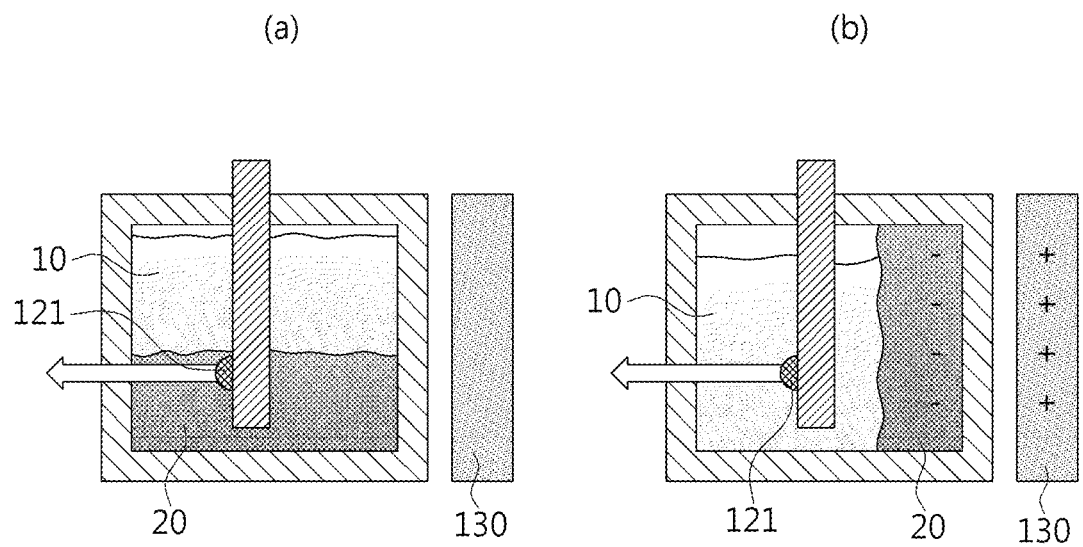
FIGS. 2A to 2D are diagrams illustrating a case in which a light source device is configured according to specific gravity and a color of each of a polarity material and a nonpolarity material.

First, FIG. 2A shows a case in which specific gravity of a nonpolarity material 10 is less than that of a polarity material 20, and the nonpolarity material 10 is colorless (or transparent) and the polarity material 20 is colored (e.g., yellow).

That is, the colorless nonpolarity material 10 is located above the colored (e.g., yellow) polarity material 20. At this point, a light source 121 is disposed inside the polarity material 20 before a current is applied to an electromagnet 130.

A case in which the current is not applied to the electromagnet 130 is shown in (a) of FIG. 2A. Here, since the light source 121 is located inside the polarity material 20, the light source device 100 irradiates light having a color included in the polarity material 20.

A case in which the current is applied to the electromagnet 130 is shown in (b) of FIG. 2A. Here, since the polarity material 20 moves in a direction of the electromagnet 130 and thus the light source 121 is located inside the nonpolarity material 10, the light source device 100 irradiates colorless light of the nonpolarity material 10.

Figure 2B:
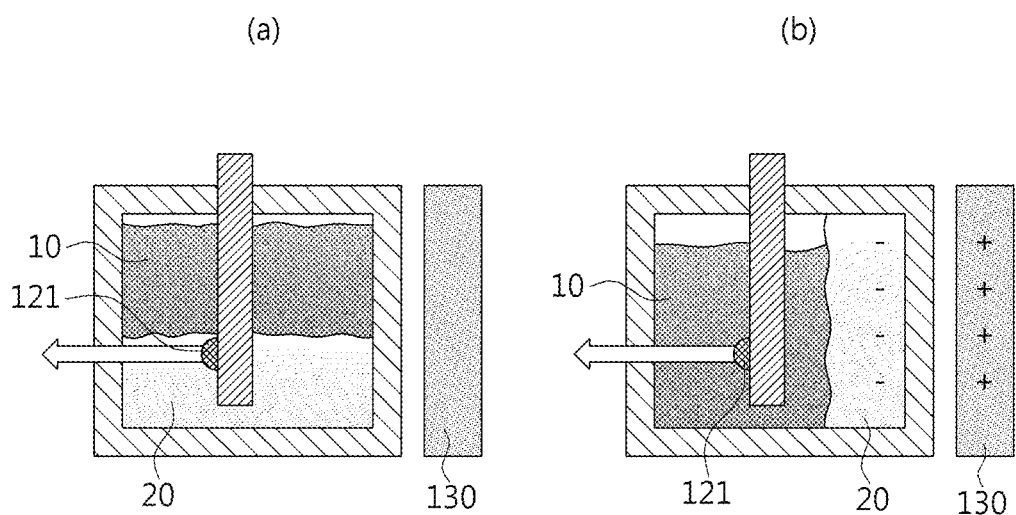

Next, FIG. 2B shows a case in which the specific gravity of a nonpolarity material 10 is less than that of the polarity material 20, and the nonpolarity material 10 is colored and the polarity material 20 is colorless (or transparent).

That is, the colored nonpolarity material 10 is located above the colorless polarity material 20. At this point, the light source 121 is disposed inside the polarity material 20 before the current is applied to the electromagnet 130.

A case in which the current is not applied to the electromagnet 130 is shown in (a) of FIG. 2B. Here, since the light source 121 is located inside the polarity material 20, the light source device 100 irradiates colorless light of the polarity material 20.

A case in which the current is applied to the electromagnet 130 is shown in (b) of FIG. 2B. Here, since the polarity material 20 moves in the direction of the electromagnet 130 and thus the light source 121 is located inside the nonpolarity material 10, the light source device 100 irradiates light having a color included in the nonpolarity material 10.

Figure 2C:
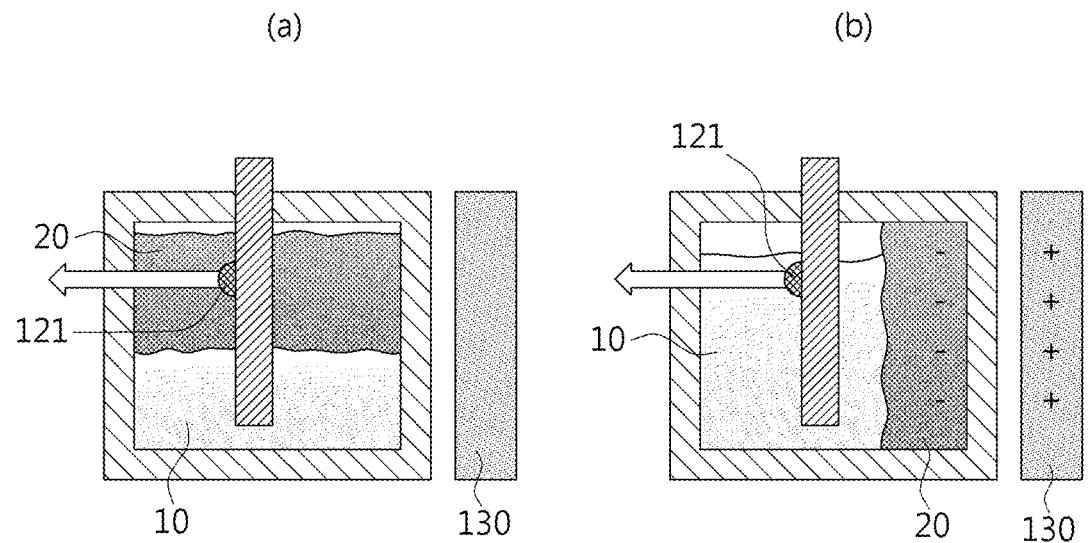

Next, FIG. 2C shows a case in which the specific gravity of a nonpolarity material 10 is greater than that of the polarity material 20, and the nonpolarity material 10 is colorless (or transparent) and the polarity material 20 is colored.

That is, the colorless nonpolarity material 10 is located below the colored polarity material 20. At this point, the light source 121 is disposed inside the polarity material 20 before the current is applied to the electromagnet 130.

A case in which the current is not applied to the electromagnet 130 is shown in (a) of FIG. 2C. Here, since the light source 121 is located inside the polarity material 20, the light source device 100 irradiates light having a color included in the polarity material 20.

A case in which the current is applied to the electromagnet 130 is shown in (b) of FIG. 2C. Here, since the polarity material 20 moves in the direction of the electromagnet 130 and thus the light source 121 is located inside the nonpolarity material 10, the light source device 100 irradiates colorless light of the nonpolarity material 10.

Figure 2D:
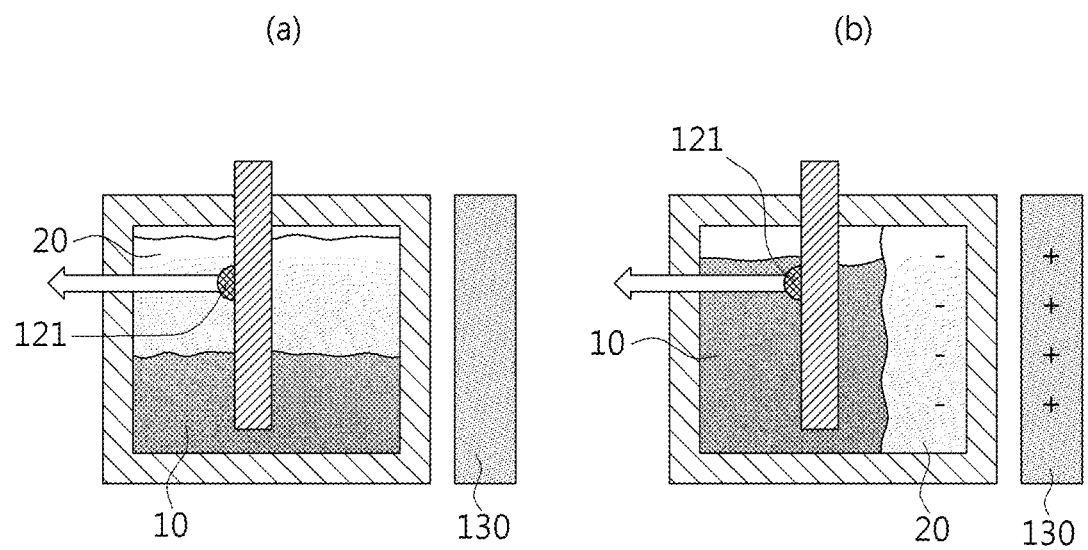

Next, FIG. 2D shows a case in which the specific gravity of a nonpolarity material 10 is greater than that of the polarity material 20, and the nonpolarity material 10 is colored and the polarity material 20 is colorless (or transparent).

That is, the colored nonpolarity material 10 is located below the colorless polarity material 20. At this point, the light source 121 is disposed inside the polarity material 20 before the current is applied to the electromagnet 130.

A case in which the current is not applied to the electromagnet 130 is shown in (a) of FIG. 2D. Here, since the light source 121 is located inside the polarity material 20, the light source device 100 irradiates colorless light of the polarity material 20.

A case in which the current is applied to the electromagnet 130 is shown in (b) of FIG. 2D. Here, since the polarity material 20 moves in the direction of the electromagnet 130, and thus the light source 121 is located inside the nonpolarity material 10, the light source device 100 irradiates light having a color included in the nonpolarity material 10.

FIGS. 3A to 3D are diagrams illustrating a case in which a light source device is configured according to a direction of an electromagnet.

Figure 3A:
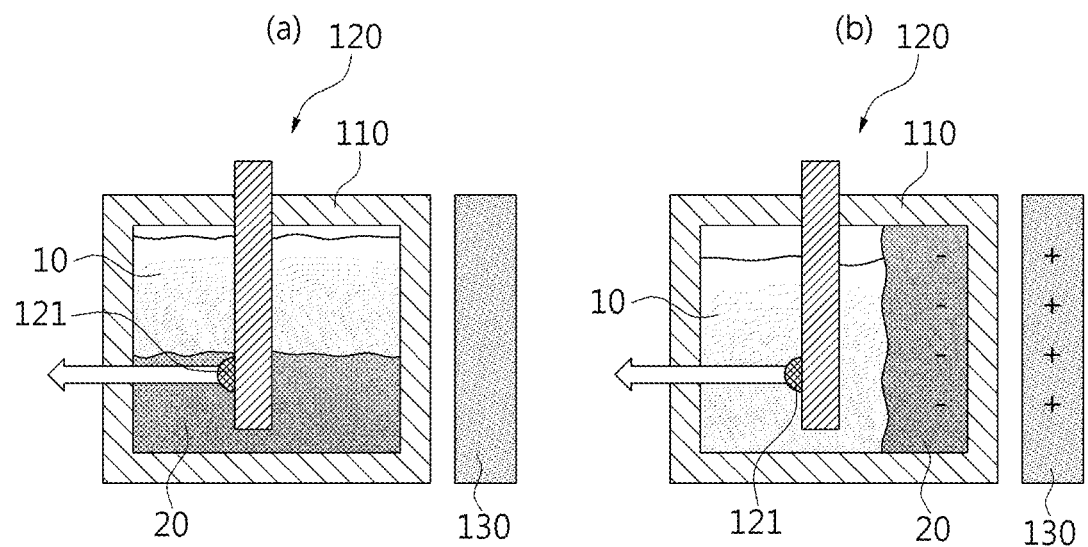
FIGS. 3A to 3D are diagrams illustrating a case in which a light source device is configured according to a direction of an electromagnet.

FIG. 3A shows a case in which the electromagnet 130 is disposed beside the transparent frame 110, an opening is formed at an upper surface of the transparent frame 110, and the light source portion 120 is inserted into the opening and disposed inside the transparent frame 110.

Here, specific gravity of a nonpolarity material 10 is less than that of a polarity material 20, and the nonpolarity material 10 is colorless (or transparent) and the polarity material 20 is colored. That is, the colorless nonpolarity material 10 is located above the colored polarity material 20. At this point, the light source 121 is disposed inside the polarity material 20 before the current is applied to the electromagnet 130.

A case in which the current is not applied to the electromagnet 130 is shown in (a) of FIG. 3A. Here, since the light source 121 is located inside the polarity material 20, the light source device 100 irradiates light having a color included in the polarity material 20.

A case in which the current is applied to the electromagnet 130 is shown in (b) of FIG. 3A. Here, since the polarity material 20 moves in a direction of the electromagnet 130, i.e., to a side surface of the transparent frame 110, and thus the light source 121 is located inside the nonpolarity material 10, the light source device 100 irradiates colorless light of the nonpolarity material 10.

Figure 3B:
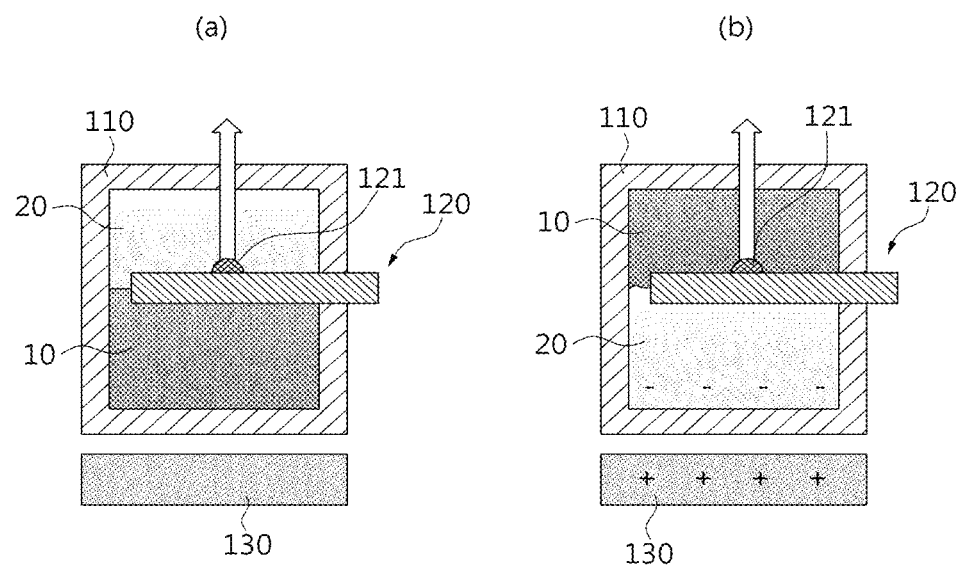

FIG. 3B shows a case in which the electromagnet 130 is disposed below the transparent frame 110, an opening is formed at the side surface of the transparent frame 110, and the light source portion 120 is inserted into the opening and disposed inside the transparent frame 110.

Here, the specific gravity of the nonpolarity material 10 is greater than that of the polarity material 20, and the nonpolarity material 10 is colored and the polarity material 20 is colorless (or transparent). That is, the colored nonpolarity material 10 is located below the colorless polarity material 20. At this point, the light source 121 is disposed inside the polarity material 20 before the current is applied to the electromagnet 130.

A case in which the current is not applied to the electromagnet 130 is shown in (a) of FIG. 3B. Here, since the light source 121 is located inside the polarity material 20, the light source device 100 irradiates colorless light of the polarity material 20.

A case in which the current is applied to the electromagnet 130 is shown in (b) of FIG. 3B. Here, since the polarity material 20 moves in a direction of the electromagnet 130, i.e., to a lower surface of the transparent frame 110, and thus the light source 121 is located inside the nonpolarity material 10, the light source device 100 irradiates light having a color included in the nonpolarity material 10.

Figure 3C:
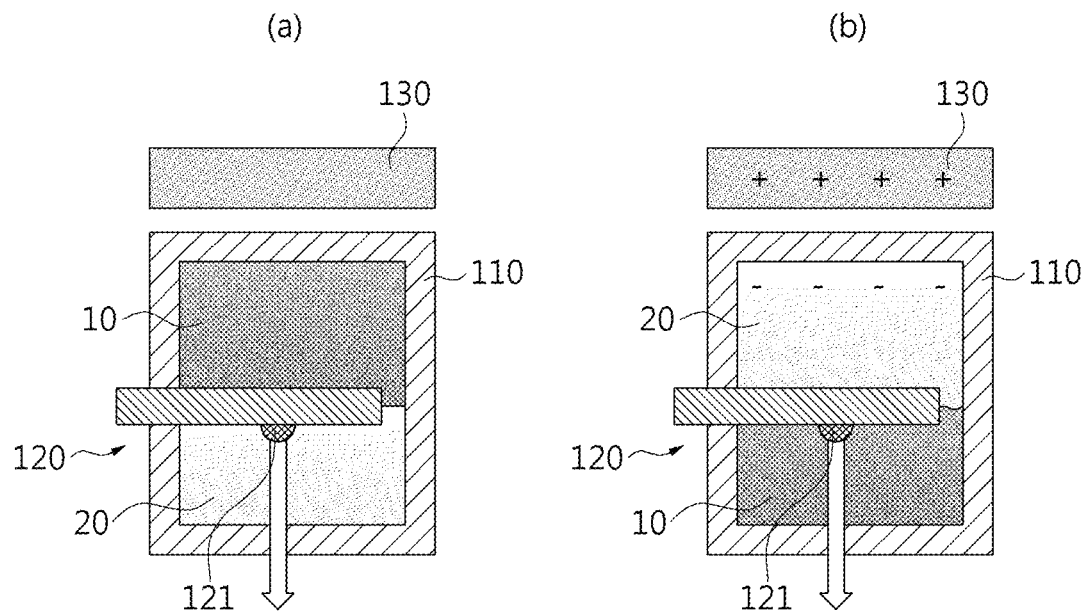

FIG. 3C shows a case in which the electromagnet 130 is disposed above the transparent frame 110, an opening is formed at the side surface of the transparent frame 110, and the light source portion 120 is inserted into the opening and disposed inside the transparent frame 110.

Here, the specific gravity of the nonpolarity material 10 is less than that of the polarity material 20, and the nonpolarity material 10 is colored and the polarity material 20 is colorless (or transparent). That is, the colored nonpolarity material 10 is located above the colorless polarity material 20. At this point, the light source 121 is disposed inside the polarity material 20 before the current is applied to the electromagnet 130.

A case in which the current is not applied to the electromagnet 130 is shown in (a) of FIG. 3C. Here, since the light source 121 is located inside the polarity material 20, the light source device 100 irradiates colorless light of the polarity material 20.

A case in which the current is applied to the electromagnet 130 is shown in (b) of FIG. 3C. Here, since the polarity material 20 moves in a direction of the electromagnet 130, i.e., to the upper surface of the transparent frame 110, and thus the light source 121 is located inside the nonpolarity material 10, the light source device 100 irradiates light having a color included in the nonpolarity material 10.

Figure 3D:
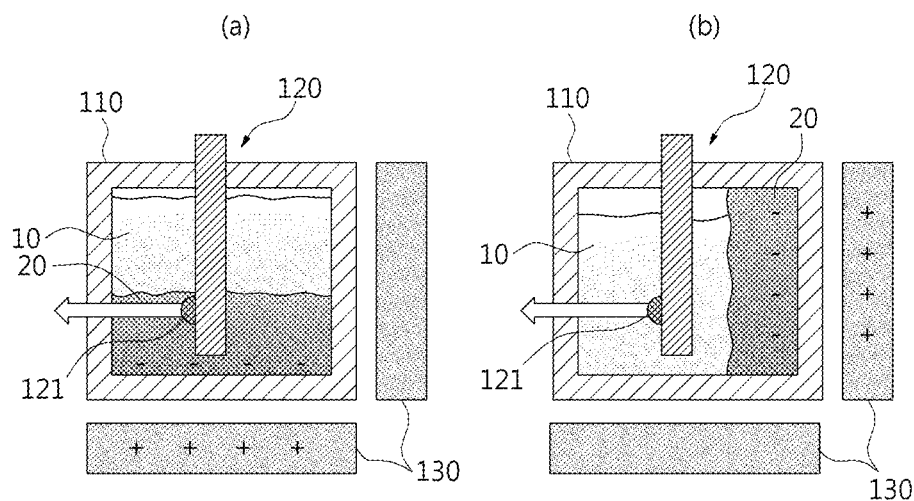

FIG. 3D shows a case in which the electromagnet 130 is disposed below and beside the transparent frame 110, an opening is formed at the upper surface of the transparent frame 110, and the light source portion 120 is inserted into the opening and disposed inside the transparent frame 110.

In this case, irrespective of the specific gravity of each of the nonpolarity material 10 and the polarity material 20, a color of light emitted from the light source 121 may be varied by alternately applying the current to the electromagnets 130 disposed below and beside the transparent frame 110. Here, the nonpolarity material 10 is colorless (or transparent) and the polarity material 20 is colored.

A case in which the current is applied to the electromagnet 130 disposed below the transparent frame 110 is shown in (a) of FIG. 3D. Here, since the polarity material 20 moves in the direction of the electromagnet 130, i.e., to the lower surface of the transparent frame 110, and thus the light source 121 is located inside the polarity material 20, the light source device 100 irradiates light having a color included in the nonpolarity material 10.

A case in which the current is applied to the electromagnet 130 disposed beside the transparent frame 110 is shown in (b) of FIG. 3D. Here, since the polarity material 20 moves in the direction of the electromagnet 130, i.e., to the side surface of the transparent frame 110, and thus the light source 121 is located inside the nonpolarity material 10, the light source device 100 irradiates colorless light of the nonpolarity material 10.

Figure 4A:
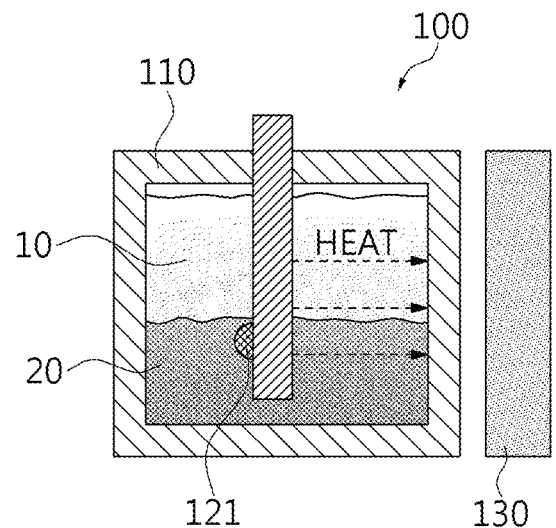
FIGS. 4A to 4C are diagrams illustrating a case in which a light source device is configured according to a position of a light source.
Figure 4B:
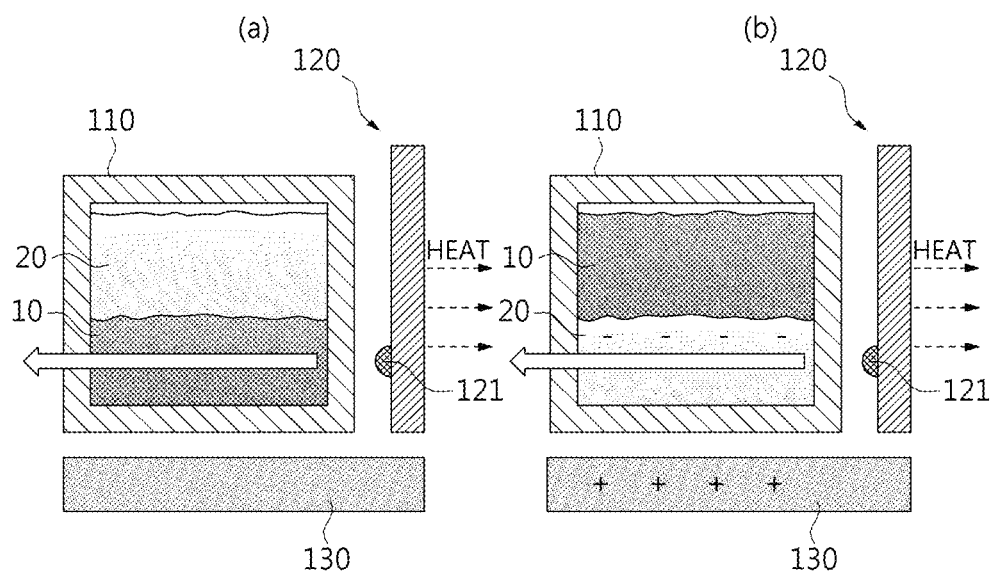
Figure 4C:
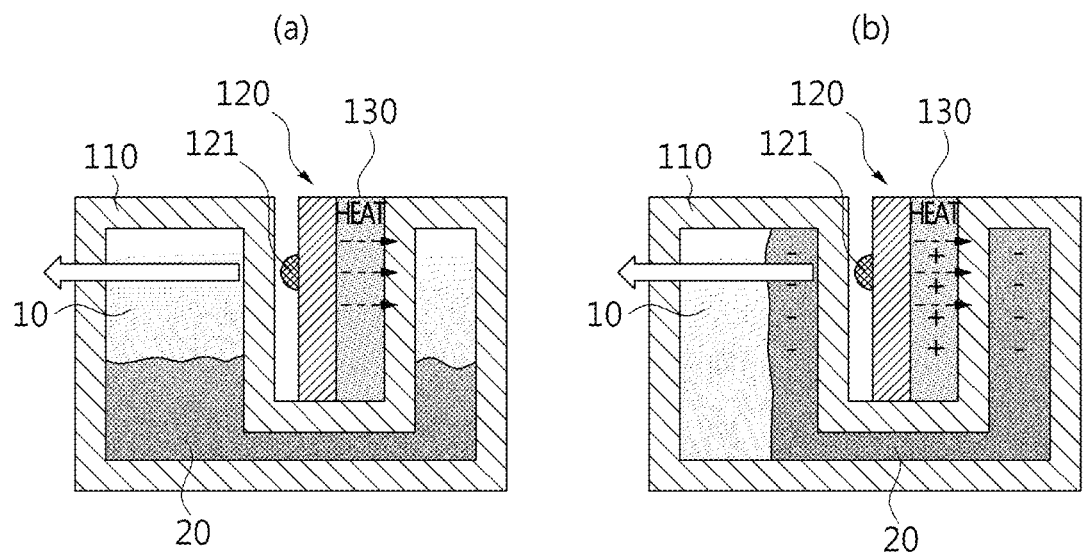

FIGS. 4A to 4C are diagrams illustrating a case in which a light source device is configured according to a position of a light source.

As described above, FIG. 4A shows a case in which the light source 121 of the light source portion 120 is located in the inner space of the transparent frame 110 in the light source device 100, and heat generated from the light source 121 is discharged to the outside in a water-cooled manner through the polarity material 20 and the nonpolarity material 10.

FIG. 4B shows a case in which the light source 121 of the light source portion 120 is located outside the transparent frame 110 in the light source device 100, and only the polarity material 20 and the nonpolarity material 10 are accommodated and sealed in the inner space of the transparent frame 110. At this point, the heat generated from the light source 121 of the light source portion 120 may be discharged to the outside in an air-cooled manner. The light source 121 of the light source portion 120 is disposed inside the polarity material 10 before the current is applied to the electromagnet 130.

A case in which the current is not applied to the electromagnet 130 is shown in (a) of FIG. 4B, and a case in which the current is applied to the electromagnet 130 is shown in (b) of FIG. 4B.

In this case, since the light source 121 of the light source portion 120 is disposed outside the transparent frame 110 and is separated from the polarity material 20 or the nonpolarity material 10, the polarity material 20 and the nonpolarity material 10 accommodated in the inner space of the transparent frame 110 may be distinctly separated from each other such that vivid color sense can be exhibited.

Specifically, the light source device 100 of FIG. 4B may be applied as a unit configuration in the following description of FIG. 5A, and in such a unit configuration, a transparent frame may be formed in a matrix structure configured with rows and columns and be disposed at a front end of the light source portion 120. In this case, when the number of the columns is increased, the light source portion 120 may employ a structure (e.g., see FIGS. 6A to 6E which will be described below) in which a light source 121 is disposed at each of the columns, or a structure (e.g., see FIG. 6F which will be described below) in which light is diffused to all the columns using only a single light source 121. This will be described in detail below with reference to FIG. 5A.

FIG. 4C shows a case in which the light source portion 120 and the electromagnet 130 are located at a recessed hollow portion of a U-shaped transparent frame 110, and only the polarity material 20 and the nonpolarity material 10 are accommodated and sealed in the inner space of the transparent frame 110. At this point, heat generated from the light source 121 of the light source portion 120 may be discharged to outside of the light source portion 120 (e.g., in a water-cooled manner).

Here, specific gravity of the nonpolarity material 10 is less than that of the polarity material 20, and the nonpolarity material 10 is colorless (or transparent) and the polarity material 20 is colored. That is, the colorless nonpolarity material 10 is located above the colored polarity material 20, and the nonpolarity material 10 and the polarity material 20 are distributed at left and right sides of the U-shaped transparent frame 110. Further, the light source 121 of the light source portion 120 is disposed toward the polarity material 10 before the current is applied to the electromagnet 130.

A case in which the current is not applied to the electromagnet 130 is shown in (a) of FIG. 4C, and a case in which the current is applied to the electromagnet 130 is shown in (b) of FIG. 4C.

The case in which the current is not applied to the electromagnet 130 is shown in (a) of FIG. 4C. Here, since the light source 121 is located toward the polarity material 10, the light source device 100 irradiates colorless light of the polarity material 10.

The case in which the current is applied to the electromagnet 130 is shown in (b) of FIG. 4C. Here, since the polarity material 20 moves in a direction of the electromagnet 130, i.e., along the U-shaped transparent frame 110, the light source device 100 irradiates light having a color included in the polarity material 20. At this point, since the electromagnet 130 is located at a central portion of the U-shaped transparent frame 110, a magnetic force is formed along the U-shaped the transparent frame 110.

In this case, like the case shown in FIG. 4B, since the light source 121 of the light source portion 120 is disposed outside the U-shaped transparent frame 110 and is separated from the polarity material 20 or the nonpolarity material 10, the polarity material 20 and the nonpolarity material 10 accommodated in the inner space of the U-shaped transparent frame 110 may be distinctly separated from each other such that vivid color sense can be exhibited.

The light source device 100 of FIGS. 4A and 4C may discharge heat generated from the light source 121 of the light source portion 120 (e.g., through water-cooled heat dissipation using fluid). Since a boiling point of the fluid is matched to a junction limit temperature of an LED element when the light source 121 is the LED element, a phase change of the fluid occurs to absorb evaporation heat when the boiling point reaches the junction limit temperature such that burning of the LED element is prevented.

FIGS. 5A to 5D are diagrams illustrating a case in which a light source device is configured to have a plurality of transparent frames.

As shown in FIGS. 5A to 5D, the light source device 100 is configured with a plurality of transparent frames 110a and 110b to implement multi-functions, and, for convenience of description, the plurality of transparent frames 110a and 110b will be separated into and described as a first transparent frame 110a and a second transparent frame 110b.

Accordingly, the first transparent frame 110a accommodates to seal a first nonpolarity material 10a and a first polarity material 20a in an inner space of the first transparent frame 110a, and the second transparent frame 110b accommodates to seal a second nonpolarity material 10b and a second polarity material 20b in an inner space of the second transparent frame 110b. At this point, the first transparent frame 110a and the second transparent frame 110b are disposed in parallel, and the light source portion 120 is disposed beside the second transparent frame 110b.

Specific gravity of the first nonpolarity material 10a is greater than that of the first polarity material 20a, and the first nonpolarity material 10a is colorless (or transparent) and the first polarity material 20a is colored (e.g., red). Similarly, specific gravity of the second nonpolarity material 10b is greater than that of the second polarity material 20b, and the second nonpolarity material 10b is colorless (or transparent) and the second polarity material 20b is colored (e.g., red).

A first electromagnet 130a and a second electromagnet 130b are respectively disposed below the first transparent frame 110a and the second transparent frame 110b.

In the light source device 100, a color of light emitted from the light source 121 of the light source portion 120 is varied as a current is applied to the first electromagnet 130a or the second electromagnet 130b.

Figure 5A:
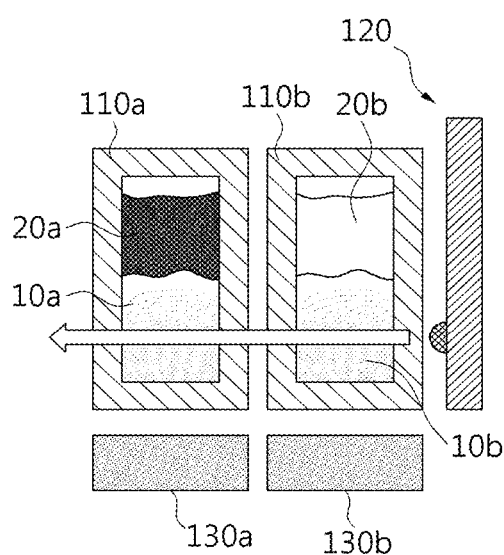
FIGS. 5A to 5D are diagrams illustrating a case in which a light source device is configured to have a plurality of transparent frames.

Referring to FIG. 5A, when the current is not applied to the first electromagnet 130a and the second electromagnet 130b, the color of the light emitted from the light source 121 of the light source portion 120 is exhibited by directly passing through the first nonpolarity material 10a of the first transparent frame 110a and the second nonpolarity material 10b of the second transparent frame 110b. That is, the light source device 100 directly irradiates the light emitted from the light source 121.

Figure 5B:
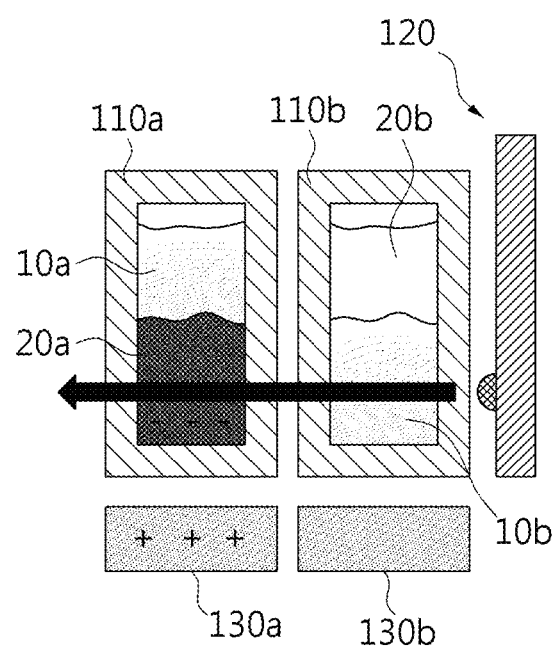

Referring to FIG. 5B, when the current is applied to the first electromagnet 130a and is not applied to the second electromagnet 130b, the color of the light emitted from the light source 121 of the light source portion 120 is exhibited by passing through the first polarity material 20a of the first transparent frame 110a and the second nonpolarity material 10b of the second transparent frame 110b. That is, the light source device 100 irradiates the light emitted from the light source 121 with a color (red) included in the first polarity material 20a.

Figure 5C:
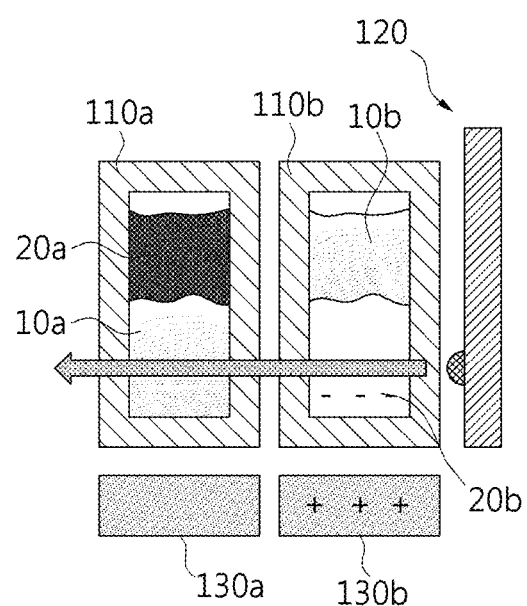

Referring to FIG. 5C, when the current is not applied to the first electromagnet 130a and is applied to the second electromagnet 130b, the color of the light emitted from the light source 121 of the light source portion 120 is exhibited by passing through the first nonpolarity material 10a of the first transparent frame 110a and the second polarity material 20b of the second transparent frame 110b. That is, the light source device 100 irradiates the light emitted from the light source 121 with a color (green) included in the second polarity material 20b.

Figure 5D:
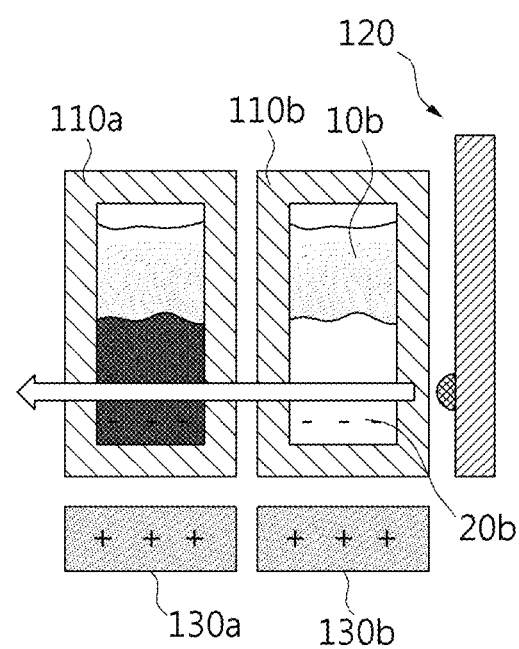

Referring to FIG. 5D, when the current is applied to the first electromagnet 130a and the second electromagnet 130b, the color of the light emitted from the light source 121 of the light source portion 120 is exhibited by passing through the first polarity material 20a of the first transparent frame 110a and the second polarity material 20b of the second transparent frame 110b. That is, in the light source device 100, the light emitted from the light source 121 is exhibited with a color (yellow) with which the color (red) included in the first polarity material 20a and the color (green) included in the second polarity material 20b are combined.

As described above, the light source devices 100 shown in FIGS. 5A to 5D may implement a rear combination lamp.

That is, as shown in FIG. 5A, when the current is not applied to the first electromagnet 130a and the second electromagnet 130b, the light source device 100 may implement the white light to use the white light for a backup lamp (B/UP). Further, as shown in FIG. 5B, when the current is applied to the first electromagnet 130a and is not applied to the second electromagnet 130b, the light source device 100 may implement the red light to use the red light for a position stop lamp. Furthermore, as shown in FIG. 5D, when the current is applied to the first electromagnet 130a and the second electromagnet 130b, the light source device 100 may implement the yellow light to use the yellow light for a rear turn lamp.

However, as shown in FIG. 5C, when the current is not applied to the first electromagnet 130a and is applied to the second electromagnet 130b, the light source device 100 may implement the green light to use the green light. This case may be used when the regulations are satisfied.

Figure 6A:
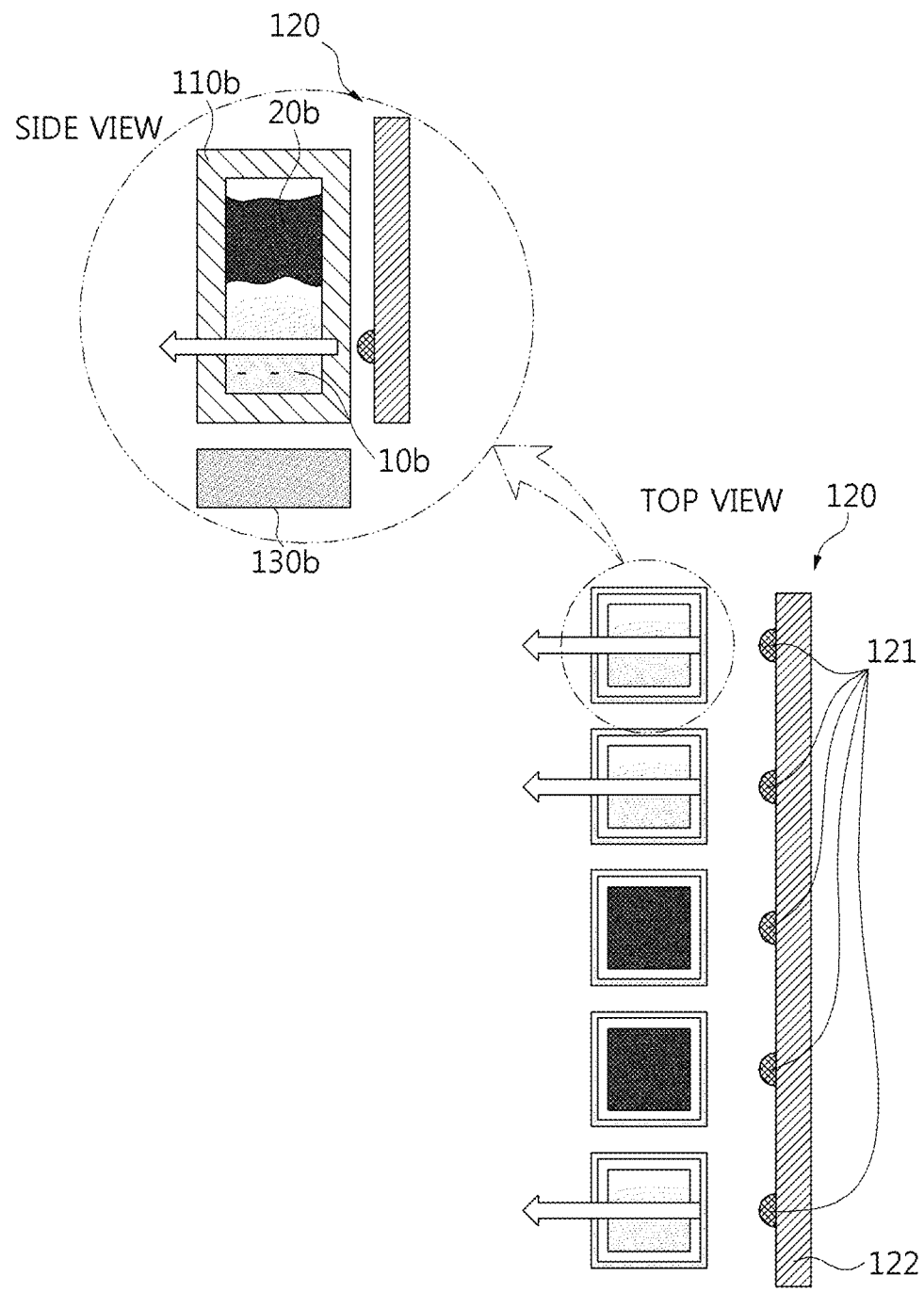
FIGS. 6A to 6E are diagrams illustrating a case in which a plurality of light source devices is configured to implementing pixel lighting.
Figure 6B:
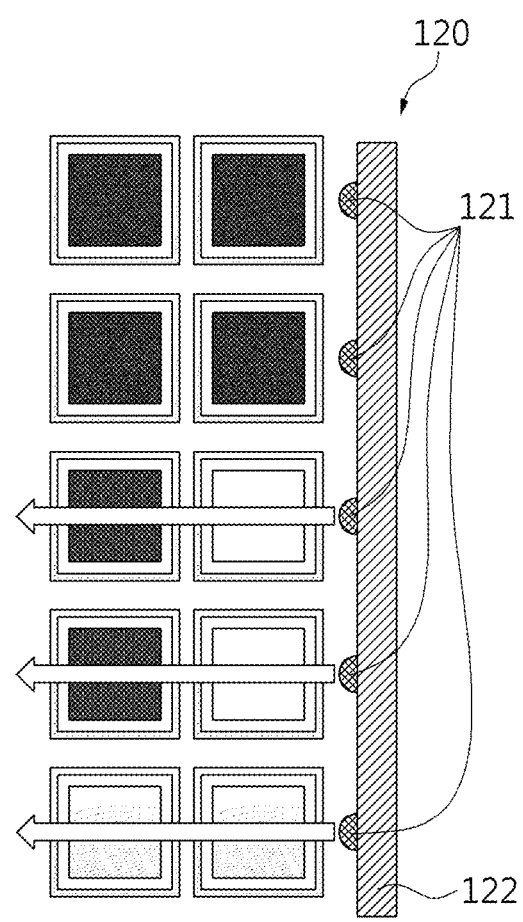
Figure 6C:
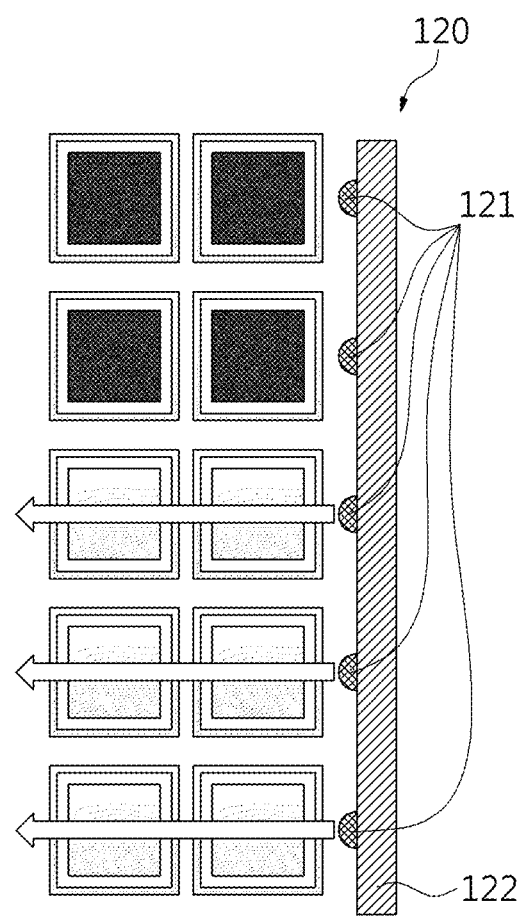
Figure 6D:
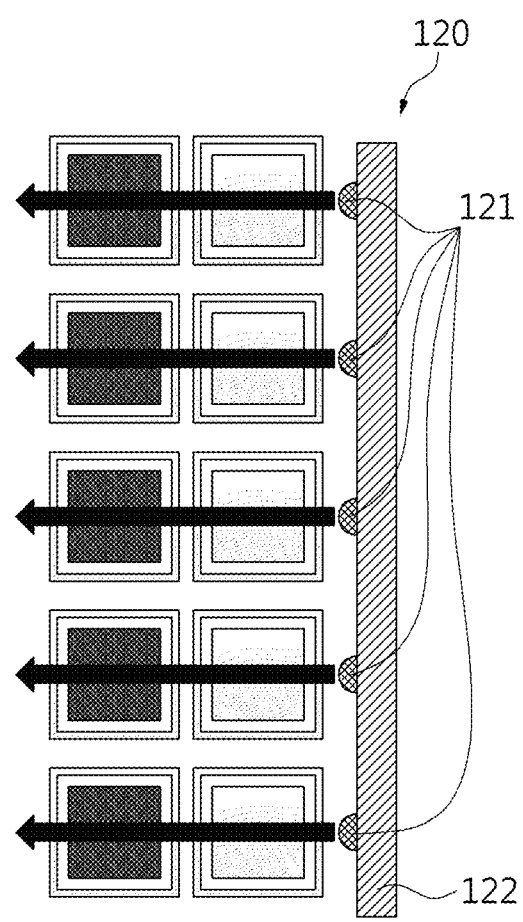
Figure 6E:
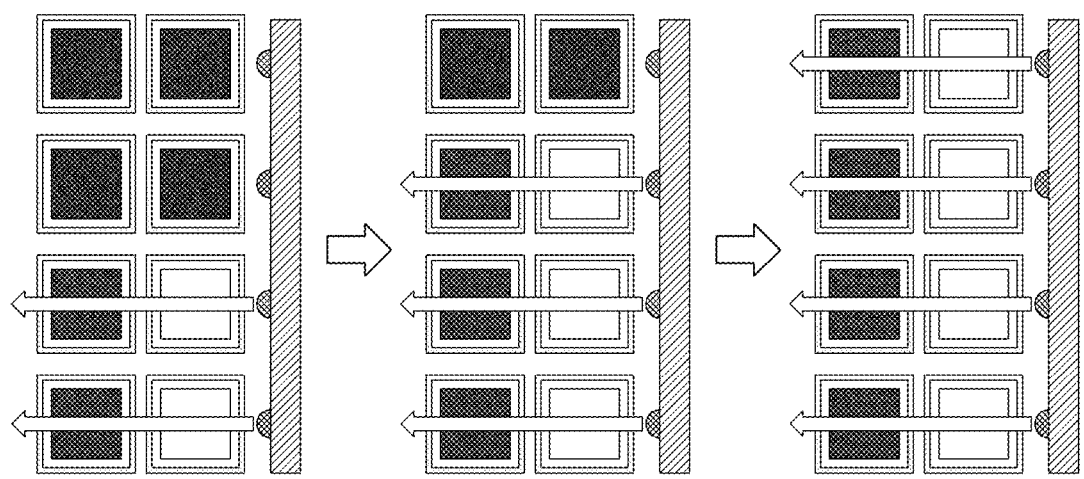
Figure 6F:
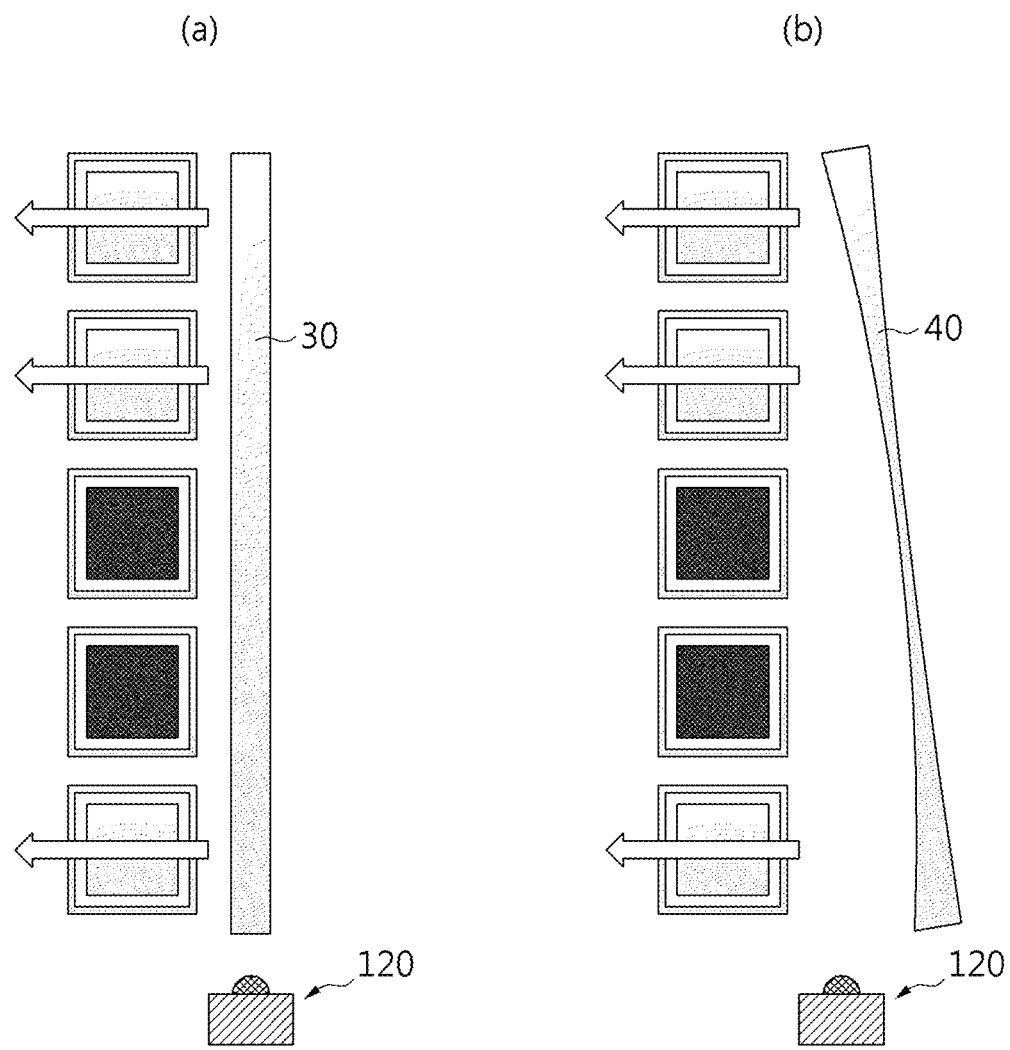
FIG. 6F is a diagram illustrating examples of light source portions in the plurality of light source devices shown in FIGS. 6A to 6E.

FIGS. 6A to 6E are diagrams illustrating a case in which a plurality of light source devices are configured to implement pixel lighting, and FIG. 6F is a diagram illustrating examples of light source portions in the plurality of light source devices shown in FIGS. 6A to 6E.

FIG. 6A shows a case in which a plurality of light source devices 100 is disposed in tandem to implement pixel lighting. In this case, a light source portion 120 configured to irradiate light on the plurality of light source devices 100 is installed at the outside.

As described above, each of the plurality of light source devices 100 is configured such that a nonpolarity material 10b and a polarity material 20b are accommodated in an inner space of the transparent frame 110b, and the electromagnet 130b is disposed below the transparent frame 110b. Further, the light source portion 120 includes a single PCB substrate 122 on which a plurality of light sources 121 corresponding to the plurality of light source devices 100 are mounted. Each of the plurality of light sources 121 is installed below the transparent frame 110b. A predetermined color may be included in the nonpolarity material 10b or the polarity material 20b which is accommodated in the transparent frame 110b. At this point, a colorless (or transparent) material for blocking light may be included.

As a current is applied to the electromagnet 130b, each of the plurality of light source devices 100 switches a position of the nonpolarity material 10b or the polarity material 20b. The plurality of light source devices 100 turn on all the plurality of light sources 121 and then independently control the electromagnet 130b, thereby implementing the pixel lighting.

FIGS. 6B to 6E show a case in which a plurality of light source devices 100 are disposed in a row in parallel to each other to implement multi-functional pixel lighting. In this case, the light source portion 120 configured to irradiate light on the plurality of light source devices 100 is also installed at the outside.

As described above, each of the plurality of light source devices 100 is configured such that the nonpolarity material 10 and the polarity material 20 are accommodated in the inner space of the transparent frame 110. Although not shown in the drawings, an electromagnet is disposed below the transparent frame 110.

As shown in FIGS. 6B to 6E, the nonpolarity material 10 or the polarity material 20 accommodated in the transparent frame 110 may include various colors according to the purpose of use.

Each of the plurality of light source devices 100 implements multi-functional pixel lighting by controlling the electromagnet.

Specifically, FIG. 6A shows a case in which the plurality of light source devices 100 sequentially turn on the plurality of light sources 121 to implement the pixel lighting.

FIG. 6F shows a case in which a light source portion 120 irradiates light on a plurality of light source devices 100 using a single light source 121.

A case in which light emitted from the single light source 121 is irradiated to the plurality of light source devices 100 using a light guide 30 is shown in (a) of FIG. 6F, and a case in which indirect light, which is produced by reflecting the light emitted from the light source 121 using a reflector 40, is irradiated to the plurality of light source devices 100 is shown in (b) of FIG. 6F.

Figure 7:
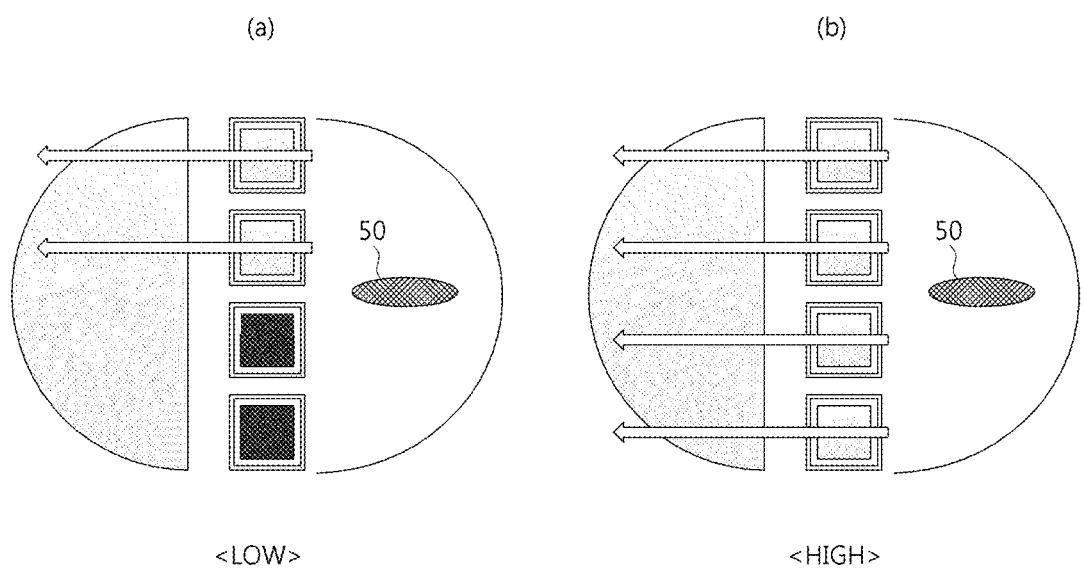
FIG. 7 is a diagram illustrating a case in which a plurality of light source devices is configured to implement a bulb bifunction.

FIG. 7 is a diagram illustrating a case in which a plurality of light source devices is configured to implement a bulb bifunction.

As shown in FIG. 7, a plurality of light source devices 100 may be used when implementing a bulb bifunction by passing or blocking light emitted from a bulb 50. Here, the nonpolarity material 10 or the polarity material 20 included in the plurality of light source devices 100 may be colorless (or transparent) or may include a material for blocking light.

The plurality of light source devices 100 form a low beam by irradiating only a portion of the light emitted from the bulb 50 as shown in (a) of FIG. 7 and form a high beam by irradiating all the light emitted from the bulb 50 as shown in (b) of FIG. 7.

In accordance with embodiments of the present disclosure, it is possible to apply a light source device to a vehicle lamp having various functions by varying a color of light emitted from a light source using a characteristic capable of switching a position of the material by a magnetic force generated according to the polarity of the material.

Further, in accordance with embodiments of the present disclosure, it is possible to prevent malfunction and noise by implementing pixel lighting using an electrical property of the light source device without mechanical movement.

Furthermore, in accordance with embodiments of the present disclosure, it is possible to apply the light source device to all kinds of vehicles using LED elements by implementing the pixel lighting at low cost.

Moreover, in accordance with embodiments of the present disclosure, it is possible to improve lighting distribution performance of the light source device by implementing the pixel lighting whereby all light sources are turned on when the number of the light sources is increased, and to improve marketability of the light source device by segmenting a low-cost pixel on the basis of the same light source.

In addition, in accordance with embodiments of the present disclosure, it is possible to enhance customer satisfaction by improving brightness of a head lamp by applying of an additional current due to improvement of heat dissipation performance.

Although the foregoing description has been described with a focus on novel features of the present disclosure as being applied to various embodiments, those skilled in the art will be appreciated that various deletions, substitutions, and alterations can be made from the forms and details of the above-described apparatus and method without departing from the scope of the present disclosure. Accordingly, the scope of the present disclosure is defined by the appended claims rather than the foregoing description. All variations equivalent to the scope of the appended claims will fall within the scope of the present disclosure.

What is claimed is:

1. A light source device using a polarity of a material, the light source device comprising:
    a transparent frame forming an inner space accommodating a nonpolarity material and a polarity material;
    a light source portion irradiating light through the nonpolarity material or the polarity material accommodated in the transparent frame; and
    an electromagnet configured to switch respective positions of the nonpolarity material and the polarity material by a magnetic force generated according to the polarity of the material, wherein the magnetic force is generated as a current is applied from outside of the light source device.

2. The light source device of claim 1, wherein the nonpolarity material and the polarity material have different specific gravities or different colors.

3. The light source device of claim 1, wherein the electromagnet is disposed at a position beside, above, or below the transparent frame.

4. The light source device of claim 3, wherein the electromagnet is one of a plurality of electromagnets, and when the plurality of electromagnets are disposed at a plurality of positions relative to the transparent frame and a current is alternately applied to the plurality of electromagnets, the nonpolarity material and the polarity material have different colors irrespective of their specific gravities.

5. The light source device of claim 1, wherein the light source portion is disposed inside the transparent frame and is subject to a watertight treatment.

6. The light source device of claim 1, wherein the transparent frame has a U-shape, and the light source portion is disposed at a recessed hollow portion of the transparent frame outside the transparent frame.

7. The light source device of claim 1, wherein:
    a plurality of transparent frames, including the transparent frame, are disposed in a matrix structure which is arranged in rows and columns,
    the light source portion is disposed outside the transparent frame, and
    each of a plurality of electromagnets, including the electromagnet, is disposed separately at each of the plurality of transparent frames.

8. The light source device of claim 7, wherein the light source portion includes a plurality of light sources, each of which disposed at a position corresponding to each of the plurality of transparent frames.

9. The light source device of claim 7, further comprising a light guide or a reflector diffusing light to each of the plurality of transparent frames,
    wherein the light source portion includes a single light source.

10. The light source device of claim 8, wherein each of the plurality of light sources includes a light-emitting device (LED) element or a bulb.

11. The light source device of claim 9, wherein the single light source includes an LED element or a bulb.

12. A vehicle lamp comprising:
    a light source device including an electromagnet configured to switch respective positions of a nonpolarity material and a polarity material by a magnetic force generated according to a polarity of a material, the switching of respective positions of the nonpolarity material and the polarity material causing variance of a color of light emitted from a light source of the light source device; and
    a lamp housing coupled to the light source device and mounted on a vehicle.

13. The vehicle lamp of claim 12, wherein the light source device includes:
    a transparent frame forming an inner space accommodating the nonpolarity material and the polarity material;
    a light source portion irradiating light through the nonpolarity material or the polarity material accommodated in the transparent frame; and
    the electromagnet configured to switch the respective positions of the nonpolarity material and the polarity material by the magnetic force generated as a current is applied from outside of the light source device.

14. The vehicle lamp of claim 13, wherein:
    a plurality of transparent frames, including the transparent frame, are disposed in a matrix structure which is arranged in rows and columns,
    the light source portion is disposed outside the transparent frame, and
    each of a plurality of electromagnets, including the electromagnet, is disposed separately at each of the plurality of transparent frames.

15. The vehicle lamp of claim 14, wherein the light source portion includes a plurality of light sources, each of which disposed at a position corresponding to each of the plurality of transparent frames.

16. The vehicle lamp of claim 15, further comprising a light guide or a reflector diffusing light to each of the plurality of transparent frames,
    wherein the light source portion includes a single light source.

17. The vehicle lamp of claim 12, wherein the light source device operates as a daytime running lamp (DRL), a position lamp, and a front turn lamp when the lamp housing is mounted on a front side of the vehicle, and the light source device operates as a rear combination lamp when the lamp housing is mounted on a rear side of the vehicle.

* * * * *